United States Patent [19]

Hartvigsen et al.

[11] Patent Number: 5,376,472
[45] Date of Patent: Dec. 27, 1994

[54] SEMI-INTERNALLY MANIFOLDED INTERCONNECT

[75] Inventors: Joseph J. Hartvigsen, Kaysville; Ashok C. Khandkar, Salt Lake City; Singaravelu Elangovan, Sandy; David W. Prouse, Salt Lake City, all of Utah

[73] Assignee: Ceramatec, Inc., Salt Lake City, Utah

[21] Appl. No.: 133,443

[22] Filed: Oct. 6, 1993

[51] Int. Cl.⁵ .................. H01M 8/10; H01M 2/14
[52] U.S. Cl. ...................................... 429/32; 429/38; 429/39
[58] Field of Search .................. 429/32, 38, 39

[56] References Cited

U.S. PATENT DOCUMENTS

| | | | |
|---|---|---|---|
| 3,394,032 | 7/1968 | Danner | 429/39 |
| 4,476,196 | 10/1984 | Poeppel et al. | 429/32 |
| 4,476,197 | 10/1984 | Herceg | 429/32 |
| 4,499,663 | 2/1985 | Zwick et al. | 429/32 |
| 4,510,212 | 4/1985 | Fraioli | 429/30 |
| 4,640,875 | 2/1987 | Makiel | 429/30 |
| 4,732,822 | 3/1988 | Wright et al. | 429/38 |
| 4,753,857 | 6/1988 | Hosaka | 429/38 |
| 4,761,349 | 8/1988 | McPheeters et al. | 429/39 |
| 4,853,301 | 8/1989 | Granata et al. | 429/39 |
| 4,877,506 | 11/1989 | Fee et al. | 429/30 |
| 4,913,982 | 4/1990 | Kotchick et al. | 429/30 |
| 4,963,442 | 10/1990 | Marianowski et al. | 429/39 |
| 5,045,413 | 9/1991 | Marianowski et al. | 429/39 |
| 5,227,256 | 7/1993 | Marianowski et al. | 429/39 |
| 5,252,409 | 10/1993 | Akagl | 429/39 |

*Primary Examiner*—Wayne Langel
*Attorney, Agent, or Firm*—Trask, Britt & Rossa

[57] ABSTRACT

A semi-internally manifolded interconnect structured for placement between successive electrolyte elements in stack of elements having a first surface with a level margin extending substantially around the perimeter of the interconnect, first and second manifold channels disposed inward from the margin, and a plurality of gas-flow channels disposed in a central area of the first surface and extending between and in fluid communication with the first and second manifold channels.

20 Claims, 2 Drawing Sheets

SEMI-INTERNALLY MANIFOLDED INTERCONNECT

TECHNICAL FIELD

The invention relates to interconnects for separating and establishing gas-flow channels between the electrolyte elements of a solid-state ion-conducting device, and more particularly interconnects which are semi-internally manifolded.

BACKGROUND ART

Solid state ion conducting devices are used in a variety of applications including fuel cells, steam electrolyzers, oxygen concentrators, and other types of electrochemical reactors. The various ion-conducting devices typically employ a plurality of solid-state electrolyte elements constructed from materials capable of conducting a specific ionic species through the element. Materials having this capability include ceramic metal oxides such as cerium oxide, hafnium oxide, zirconium oxide, thorium oxide, and bismuth oxide. Other materials such as immobilized molten electrolyte membranes, and polymeric electrolyte membranes may also be used as ion specific electrolyte materials. The electrolyte elements are typically formed as flat plates having an electrically conductive electrode material attached to one or both of the facial surfaces of the plate. Dimensions of these flat plates vary from five to twenty centimeters (cm) by 5 to 20 cm by 10 to 250 $\mu$m.

Ion conducting devices typically include a plurality of electrolyte elements arranged into a stack, with interconnects separating successive elements. The interconnects, formed in a similar shape as the electrolyte elements, space the elements apart, while grooves in the surface form gas-flow channels when the interconnects are sandwiched between the elements. The gas-flow channels enable reactant gases to flow between the elements in order to come in contact with the electrodes. The interconnects also establish an electrical pathway through the stack. In solid oxide fuel cell ("SOFC") applications, electrical interconnection of the electrolyte elements increases the electrical output obtained from the stack.

Several groove or channel configurations in the facial surfaces of interconnects are commonly used. A cross-flow configuration orients the grooves on one face 90° from the grooves on the other face. When cross flow interconnects are disposed between successive electrolyte elements, two sets of channels are formed between the elements extending through the stack at right angles to each other. The 90° offset orients the openings to each set of channels on different sides of the stack. The main advantage to cross-flow interconnects is that they simplify the attachment of a gas manifold to the stack. A manifold for one type of reactant gas, e.g. a fuel gas, may be attached to one side of the stack, and a separate manifold for another reactant gas, e.g. air, may be attached to another side of the stack. In some ion conducting applications, a separate manifold is used to collect product gases (e.g. pure oxygen) produced during operation of the device. Co-flow, counterflow, and parallel gas-flow interconnect configurations are less common, but are sometimes used for special applications.

In applications, air is introduced to flow through the gas-flow channels in contact with the cathode covered face of the electrolyte elements. When the air contacts the cathode, an electrochemical reaction occurs which generates the specific ionic species. The ions are then conducted through the thickness of the electrolyte elements to the anode on the opposite face of the elements. A reactant fuel gas such as hydrogen, a methane containing gas, a syn-fuel, or a light hydrocarbon fuel stock, is introduced to flow through the gas channels in contact with the anode face of the electrolyte elements. The specific ion reacts with the fuel gas at the anode surface in an electrochemical combustion reaction.

For example, at the cathode of a typical fuel cell, an electrochemical reaction occurs in which an ionic species, such as $O^{-2}$ from air, is formed. The $O^{-2}$ ions are conducted through the electrolyte element to the anode where they react with the fuel gas to form carbon dioxide and water. Conduction of the $O^{-2}$ ions through the electrolyte element normally occurs due to a difference in the partial pressure of $O_2$ on opposite sides of the element. In current based devices, however, an electrical potential is applied across the elements to drive the reaction.

The electrochemical reaction occurring in a SOFC is shown by the following chemical equations where methane is the fuel gas:

air side:

$$8e + 2O_2 \rightarrow 4O^{-2}$$

fuel side:

$$CH_4 + 4O^{-2} \rightarrow CO_2 + 2H_2O + 8e$$

If the two electrode surfaces are electrically connected, the fuel cell produces an electrical current from the passage of electrons from one electrode surface to the other. Electrical connection of all elements in the stack enables the cumulative electrical output from all the elements to be obtained. In this way, SOFC devices produce electrical energy directly from fuel gas combustion.

In an oxygen concentrator, air is introduced to the channels in contact with the cathode covered face of the elements, and pure molecular oxygen is collected from the opposite face. Other ion conducting devices function in a similar manner, but may have structural modifications, and different reactant gas requirements.

The electrochemical reactions occur when the electrolyte elements reach an operating temperature, typically 600°-1000° C. for ceramic oxide based fuel cells. Thermal energy from combustion of the fuel gas in a SOFC contributes to sustaining the operating temperature.

Fuel gases and air may be supplied to the electrolyte elements of a SOFC by manifolds attached over the openings to the two sets of gas-flow channels in cross-flow configured interconnects. Similarly, one manifold may be used to supply air to one set of gas-flow channels in an oxygen concentrator, and a gas collection manifold may be used to collect the pure oxygen from the other set of channels. Herein lies the main advantage to cross-flow configured interconnects. The cross flow geometry simplifies the manifolding process by orienting the openings to gas-flow channels carrying the same gas on the same side of the stack.

Internally manifolded interconnects obviate the necessity of attaching a manifold to the side of a stack of electrolyte elements and interconnects. This type of interconnect typically has a partially enclosed passageway at one or both ends of the gas-flow channels. When the interconnects are stacked together with the electrolyte elements, the passageways fit together in register to form an enclosed chamber which functions as a manifold. A gas introduced into this manifold is distributed among each of the interconnect channels in fluid communication with the plenum. In other fully internally manifolded ion conducting devices, the electrolyte plates include internal gas-flow channels and manifold chambers.

U.S. Pat. No. 4,950,562 (Yoshida et al.) discloses a fuel cell having a typical design for a cross flow interconnect. The interconnect is a flat plate constructed from an electrically conductive material, and has a plurality of grooves on each face. When interconnects of this type are arranged between successive electrolyte elements in a stack, all of the grooves in the interconnect surface extend to the edge of the stack. With this design, a gas-tight seal between the interconnect and the electrolyte element is extremely difficult to achieve because of the long, repeatedly-interrupted seam between the edge of the interconnect and the edge of the electrolyte element. At each end of every groove is a pair of corners which must be sealed against the electrolyte element. Corners are particularly difficult to seal, and much more prone to leakage than, for example, a continuous unbroken seam. It is very important to completely seal the corners at the ends of the grooves against the edge of the electrolyte elements because the gases flowing on opposite sides of the interconnect are in close proximity at the edge of the stack. If reactant gases leak from one set of channels to the other, the fuel gas may become diluted with air, whereupon the electrochemical reaction intended to occur on opposite sides of the electrolyte elements, instead, may occur in the fuel gas channels. The reaction and the products are the same, but the electron transfer of the reaction is not harnessed to provide electrical current. Failure to contain and segregate the reactant gases is a major cause of low efficiency and performance of fuel cell systems.

The difficulty in achieving a gas-tight seal at the edges of the interconnect grooves is acknowledged in U.S. Pat. Nos. 5,045,413 (Marianowski et al.) and 5,077,148 (Schora et al.). The fully internally manifolded fuel cell design of both of these patents is largely intended to overcome the problem of gas mixing, primarily at the manifold/electrolyte/interconnect interface. The electrolyte plates and separator plates ("electrolyte elements" and "interconnects" respectively as used herein) have the same configuration and are stacked together into the fuel cell stack. Each electrolyte plate and separator plate has a flattened peripheral seal to completely seal the periphery of the electrolyte/separator interface. A plurality of perforations in each electrolyte and separator plate forms internal manifold chambers within the stack.

Although the designs in Marianowski et al. and Schora et al. significantly improve the seal between the electrolyte element and the separator or interconnect, they are still subject to problems. For example, the flow pattern through the internal manifold chambers, and between the separator plates is of less than optimal uniformity since the path length that the gases must travel from the inlet to the outlet is different through each separator plate. These unequal paths result in less flow through some of the separator plates and overload of others, resulting in less than optimal efficiency. The electrolyte plate and separator plate designs are also complex, adding to the complexity of both manufacturing operations and stack assembly. The designs also add significant weight and bulk to a fuel cell stack because the internal manifold chambers are incorporated into the stack assembly.

U.S. Pat. Nos. 4,510,212 (Fraioli), 4,499,663 (Zwick et al.), and 4,476,197 (Herceg) also disclose fuel cell structures having fully internally manifolded gas-flow passageways, ostensibly to improve the efficiency and reliability of a fuel cell. However, these structures too are quite complex, and require comparatively more space than externally manifolded fuel cells.

A need exists for an interconnect which can be used more effectively in combination with a gas supply or collection manifold. Such an interconnect would provide improved sealing between the electrolyte element and the interconnect, and offer greater sealing reliability during operation. Further, the interconnect would be readily manufacturable, and easily assembled into a stack of ion conducting electrolyte elements. The interconnect should also improve the efficiency of an ion conducting device and facilitate increased fuel gas utilization.

DISCLOSURE OF THE INVENTION

The invention includes a semi-internally manifolded interconnect having a pair of opposite facial surfaces structured for placement between successive electrolyte elements in solid oxide fuel cell stacks and other ion conducting devices. The interconnect substantially improves the efficiency and reliability of the gas-tight seal between the interconnect and an adjacently positioned electrolyte element. The interconnect is intended for use in conjunction with an external gas manifold if a manifold is to be used.

The semi-internally manifolded interconnect differs from conventional interconnects in that a plurality of gas-flow grooves or channels in the surface of the interconnect do not extend from edge-to-edge. Instead, the gas-flow channels are disposed within an interior region of the interconnect, and are in fluid communication at each end with a pair of perpendicular manifold channels disposed at each end of the gas-flow channels. The manifold channels extend along the ends of the gas-flow channels, and establish fluid communication between the channels. A gas introduced into one of the manifold channels flows through the gas-flow channels, and subsequently into the manifold channel at the opposite end of the gas-flow channels.

A smooth, level margin extends substantially around the perimeter of the surface of the interconnect, and provides a substantially flat containment seal area for forming a reliable gas-tight seal when the interconnect is bonded or sealed to an electrolyte element. Each manifold channel is set back from the edge of the interconnect at one end by the margin, and extends to the edge of the interconnect at the other end through a breach in the margin. The breaches may serve as ports for introduction of gases into, and exhaust of gases from, the manifold channels.

The arrangement of the gas-flow channels and manifold channels significantly increases the surface area around the perimeter of the interconnect available for bonding and sealing the interconnect to an electrolyte element. The two breaches are the only interruptions in the margin so that the number of leak-prone corners at the ends of the gas-flow channels is significantly reduced, resulting in improved reliability, and easier manufacturing and assembly. Over 85% of the perimeter of the interconnect may be sealed to the electrolyte element, thus substantially reducing the potential for gas leaks occurring near the edges of the interconnect. Most of the stack perimeter may be sealed without concern for blocking flow passages. The delicate and tedious task of sealing the ends of the interconnect channels to the electrolyte plates is obviated, because only one inlet and one outlet are present on each face of the interconnect.

The interconnect differs from fully internally manifolded interconnects in that a separate manifold is used to deliver reactant gases to the manifold channels and gas-flow channels of the semi-internally manifolded interconnect. The design's advantage is that the interconnects are less complicated, less expensive to manufacture, and much simpler to assemble than fully internally manifolded interconnects. An ion-conducting device incorporating the semi-internally manifolded interconnect is also lighter in weight, and usually occupies less space than a comparable fully internally manifolded device. It is also much easier to seal a manifold to an ion-conducting device incorporating the interconnect because the manifold serves a much smaller area, thereby reducing containment seal area and further assuring segregation of manifolded gases. The single gas inlet and outlet per face also permit a manifold to be sealed to the stack without concern for constricting or otherwise obstructing the openings to the gas-flow channels. Since only one channel opening is present on each edge of the interconnect, a manifold is more easily aligned over the channel openings on a side of a stack incorporating the semi-internally manifolded interconnect.

A significant advantage to the interconnect is the equivalent path length over which a gas flows through the interconnect. Equivalent gas-flow path length gives rise to uniform gas-flow through the channels, resulting in improved fuel utilization. The inlet and outlet breaches through the margin may be arranged near diagonally opposed corners to allow gases flowing through the interconnect to travel a nearly equivalent path through the manifold and gas-flow channels. This feature results in a uniform distribution of gases among the channels, and results in improved efficiency and performance of an ion conducting device employing the interconnect.

The semi-internally manifolded interconnect is equally practical for use with cross-flow, counter-flow, co-flow, and parallel gas-flow configurations.

BRIEF DESCRIPTION OF THE DRAWINGS

In the drawings, which depict presently preferred embodiments of the invention, and in which like reference numerals refer to like parts in different views.

BEST MODE OF THE INVENTION

Figure 1:
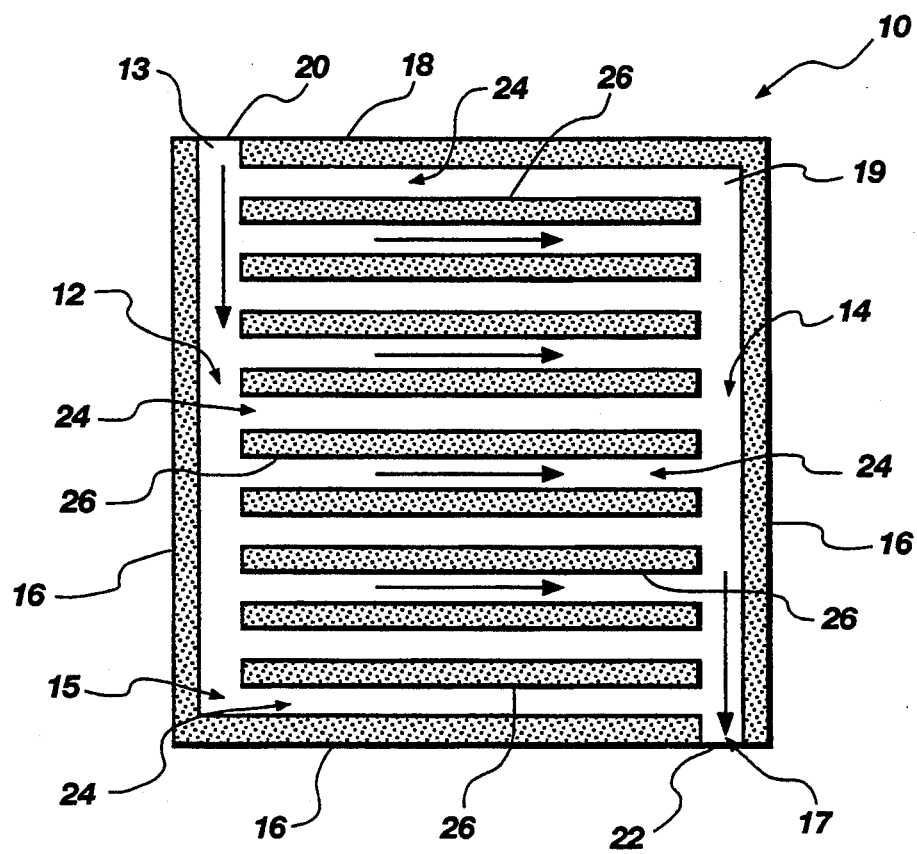
FIG. 1 is a plan view of the first surface of the semi-internally manifolded interconnect.

Referring to FIG. 1, the semi-internally manifolded interconnect 10 is formed as a substantially flat plate-like structure having a pair of opposing first and second facial surfaces. Only the first surface is shown in FIG. 1. The opposite second facial surface may be substantially identical to the first surface and oriented 90° about an axis perpendicular to both surfaces. The 90° rotation facilitates a cross flow configuration where the direction of flow of gases on each side of the interconnect are at right angles.

The interconnect may be constructed from a variety of materials, the selection of which depends in large part on the ion-conducting application, and the composition of the electrolyte elements used. For example, a typical solid oxide fuel cell may employ electrolyte elements constructed from a ceramic metal oxide such as zirconium oxide. In this case, the interconnect would preferably be constructed from an identical or similar ceramic material which could be securely bonded to the electrolyte elements. Another important factor in selecting the material for the interconnect is the coefficient of thermal expansion. The interconnects are preferably made from a material having a coefficient of thermal expansion identical or similar to that of the electrolyte elements.

A plurality of grooves or channels disposed within the surface of the interconnect form gas-flow passageways when the interconnect is sandwiched between a pair of electrolyte elements. A first 12 and second 14 manifold channel are disposed in the first facial surface of the interconnect 10. First and second manifold channels 12 and 14 may be disposed proximal opposite edges of the interconnect, but inward and isolated from the edge of the plate so as to define a smooth, level margin 16 extending substantially around the perimeter of the first facial surface. The first 12 and second manifold channels typically have a width varying from 10 mm to 1 mm (see e.g. FIG. 3 for the taper in the manifold channels). The margin 16 thus isolates first and second manifold channels 12 and 14 from the edge of the interconnect. The margin 16 constitutes a flat containment seal surface area for forming a gas-tight perimeter seal between the interconnect and the electrolyte element. A first end 13 of first manifold channel 12 extends to the edge of the interconnect through a first breach 20 in the margin 16, and a second end 15 of the channel abuts the margin 16. Similarly, a first end 17 of second manifold channel 14 extends to the edge of the interconnect through a second breach 22 in margin 16, and a second end 19 of channel 14 abuts margin 16. In a preferred embodiment, first and second breaches 20 and 22 are disposed proximal diagonal edges of the first facial surface of the interconnect 10.

A plurality of gas-flow channels 24 having a width varying from two to four millimeters are disposed within a central area of at least one of the first and second facial surfaces of the interconnect, and extend between the first and second manifold channels 12 and 14. The gas-flow channels 24 are arranged substantially parallel to each other, but substantially perpendicular to first and second manifold channels 12 and 14. The ends of the gas-flow channels 24 open into the manifold channels 12 and 14 such that fluid communication is established between both manifold channels 12 and 14, and the gas-flow channels 24.

Figure 2:
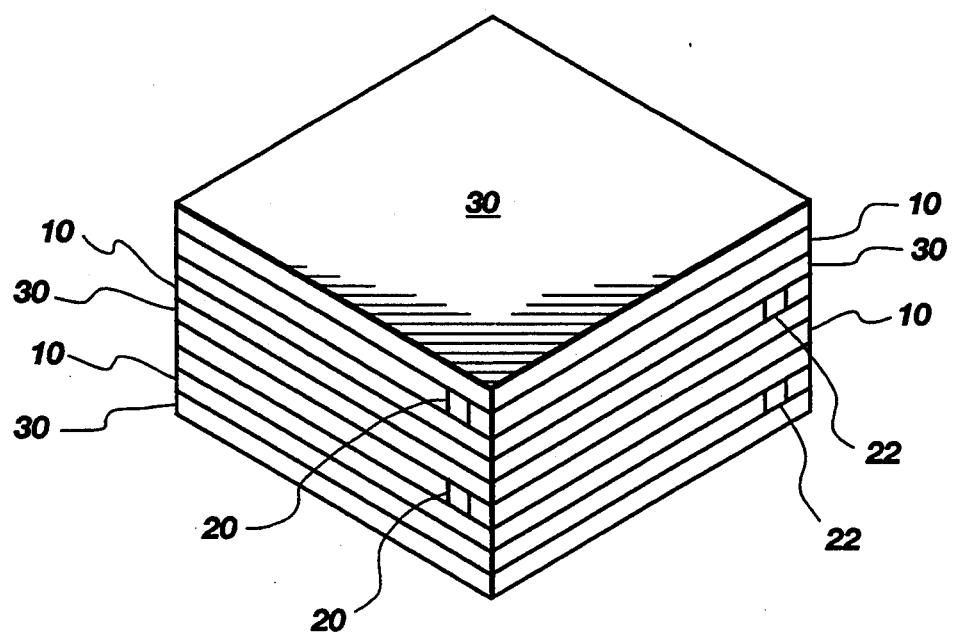
FIG. 2 is perspective view of a stack of electrolyte elements with semi-internally manifolded interconnects according to the instant invention separating successive elements.

Referring to FIG. 2, when the interconnect is sandwiched between a pair of electrolyte plates 30, manifold channels 12 and 14, and gas-flow channels 24 are enclosed, and form gas-flow passageways through the interconnect. A reactant gas introduced into the interconnect, for example through first breach 20, flows into first manifold channel 12, and is then distributed among the gas-flow channels 24. Upon flowing through the gas-flow channels 24, the gas comes in contact with the electrode material, the spent (or product) gas enters the second manifold channel 14, and flows out of the interconnect through second breach 22. Alternatively, the direction of gas-flow through the interconnect may be reversed. A typical gas-flow pathway is indicated in FIG. 1 by the hollow arrows within the manifold channels 12 and 14, and gas-flow channels 24. The gas flow path length from introduction of a gas into the interconnect 10 through first breach 20, to discharge of the gas through second breach 22, is the same regardless through which of the gas-flow channels the gas flows. This aspect of the invention provides for a substantially equivalent gas-flow volume through each gas-flow channel, resulting in better fuel gas utilization. Equivalent distribution of reactant gases allows for full utilization of the electrode surface area as compared to a gas-flow pattern where most of the reactant gas flows past a limited section of the electrode. In this latter situation, the electrode area exposed to most of the gas-flow is overloaded, while the surrounding area remains underutilized or even unused.

The margin 16 extends substantially around the perimeter of the interconnect, and provides a flat containment seal area for forming a gas-tight seal between the edge of the interconnect and the edge of an electrolyte element. Another area which may be sealed or bonded to an electrolyte element are the smooth, level ridges 26 separating successive gas-flow channels 24. These ridges typically have a width varying from 0.5 to 2 mm and a height of 0.5 to 2 mm. This flat sealing area may comprise an area for sealing or bonding the central area of the interconnect to an electrolyte element. Except for the first and second breaches 20 and 22, substantially the entire perimeter, or around 85% of the perimeter of the interconnect, may be sealed or bonded to an electrolyte plate. One advantage of this design is that the margin 16 provides a considerable operative bonding and sealing area between the edge of the interconnect and the electrolyte plate, which decreases the chance of gas leakage occurring around the edges of the interconnect. Better segregation of reactant gases is achieved because only two channels per face (manifold channels 12 and 14) extend to the edge of the interconnect. Fewer channel corners at the edge of the interconnect/electrolyte element interface means a reduced likelihood of a gas leak developing at or near this area. The margin 16 around the perimeter also simplifies attachment of a gas supply or collection manifold to an ion- conducting device, since the manifold can be bonded or sealed to the stack without concern for obstructing the openings into the channels of the interconnect. Because there are only two openings to the gas-flow channels per interconnect surface (one intake and one exhaust comprising first and second breaches 20 and 22), the containment seal area is greatly reduced which further helps to assure segregation of manifolded gases.

Co-flow, counter-flow and cross-flow configurations for the flow of gases are equally practical with the semi-internally manifolded interconnect. Intake and exhaust of reactant gases to and from the gas-flow channels through one inlet and one outlet arranged near diagonally opposed corners allows the configuration of gas-flow within the interconnect to be modified as desired.

Figure 3:
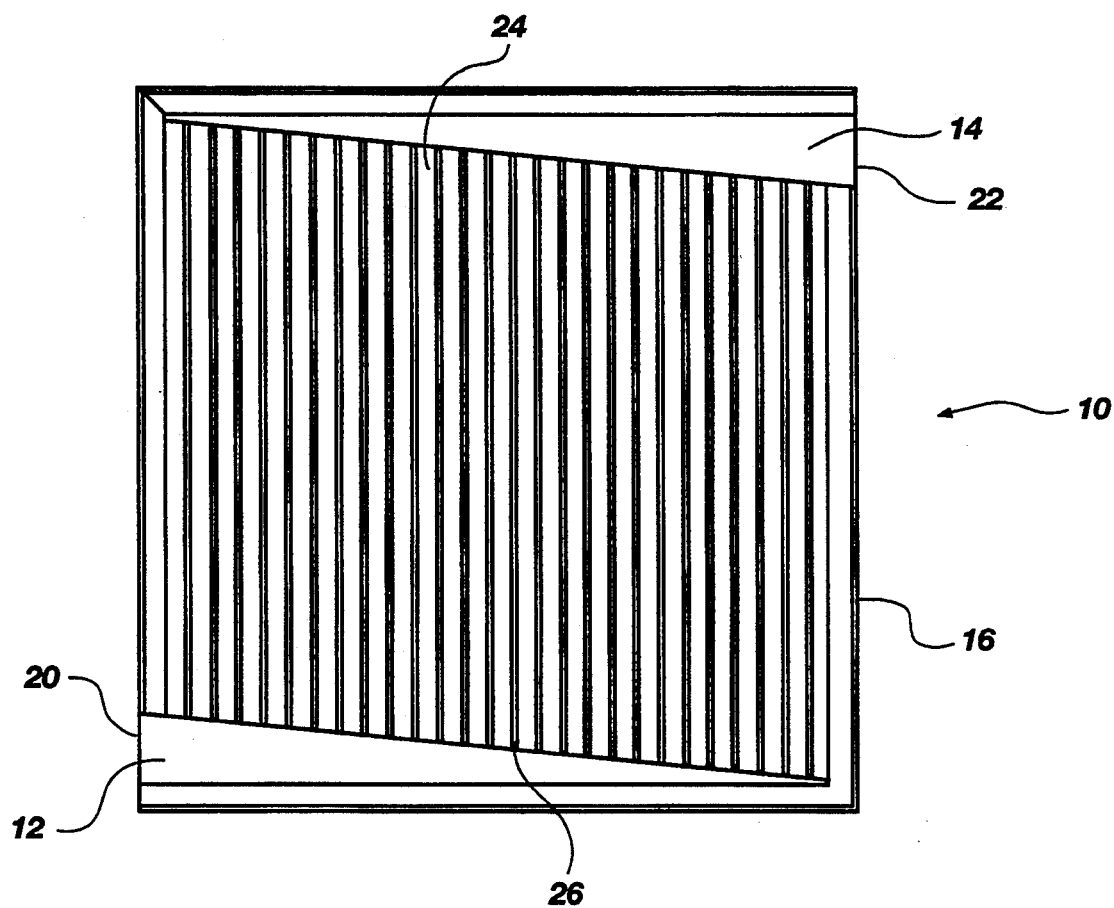
FIG. 3 is a top view of a semi-internally manifolded interconnect according to a preferred embodiment of the invention.
Figure 4:
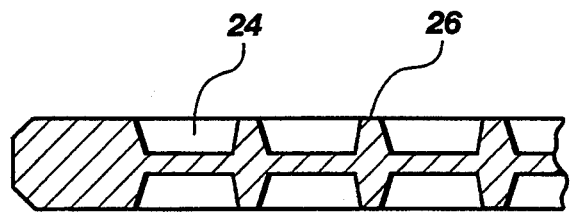
FIG. 4 is a cut-away view of a portion of an interconnect of FIG. 3.

As shown in FIG. 3, the internal manifolds 12, 14 are preferably tapered to provide more even flow distribution among the internal channels.

The interconnect can be formed by standard techniques. For example, green machining, post-sintered machining, injection molding, and near net shape pressing.

Although the interconnect has been described with a certain degree of particularity in structure, reference herein to details of the illustrated embodiment has been made by way of example only, and numerous changes in structural details may be resorted to without departing from the scope of the following claims.

What is claimed is:

1. A semi-internally manifolded interconnect having opposite first and second facial surfaces and structured for placement between successive electrolyte elements in a stack of electrolyte elements comprising:
   a smooth, level margin extending substantially around the perimeter of said first facial surface, said margin comprising a containment seal area for forming a gas-tight seal between the edge of said interconnect and the edge of a first electrolyte element;
   a first manifold channel disposed in said first facial surface inwardly from said margin, said first manifold channel extending from a first end abutting said margin to a second end extending to the edge of said interconnect through a first breach in said margin;
   a second manifold channel disposed in said first facial surface inwardly from said margin and substantially parallel with said first manifold channel, said second manifold channel extending from a first end abutting said margin to a second end extending to the edge of said interconnect through a second breach in said margin; and
   a plurality of gas-flow channels disposed in a central area of said first facial surface, said gas-flow channels in fluid communication with and extending between said first and second manifold channels.

2. The semi-internally manifolded interconnect of claim 1 wherein said first and second manifold channels are disposed proximal opposite edges of said first surface.

3. The semi-internally manifolded interconnect of claim 1 wherein said first breach and said second breach are disposed proximal diagonal edges of said first facial surface.

4. The semi-internally manifolded interconnect of claim 1 wherein said second facial surface is substantially identical in structure to said first facial surface.

5. The semi-internally manifolded interconnect of claim 4 wherein said first and second manifold channels on said first surface are disposed proximal opposite edges of said first facial surface, and said first and second manifold channels on said second facial surface are disposed proximal opposite edges of said second facial surface.

6. The semi-internally manifolded interconnect of claim 4 wherein said first and second breaches on said first facial surface are disposed proximal diagonal edges of said first facial surface, and said first and second breaches on said second facial surface are disposed proximal diagonal edges of said second facial surface.

7. The semi-internally manifolded interconnect of claim 1 wherein said second facial surface is substantially similar in structure to said first facial surface but oriented 90° from the orientation of said first surface about an axis perpendicular to both said first and second facial surfaces.

8. The semi-internally manifolded interconnect of claim 7 wherein said first and second manifold channels on said first surface are disposed proximal opposite edges of said first facial surface, and said first and second manifold channels on said second facial surface are disposed proximal opposite edges of said second facial surface.

9. The semi-internally manifolded interconnect of claim 4 wherein said first and second breaches on said first facial surface are disposed proximal diagonal edges of said first facial surface, and said first and second breaches on said second facial surface are disposed proximal diagonal edges of said second facial surface.

10. The semi-internally manifolded interconnect of claim 1 wherein said first and second breaches are gas inlet and outlet channels.

11. The semi-internally manifolded interconnect of claim 10 wherein a gas-flow passageway through said interconnect comprises a passageway from said first manifold channel through said first breach, through parallel gas-flow channels to said second manifold channel, to said second breach.

12. The semi-internally manifolded interconnect of claim 11 wherein the length of the gas-flow passageway from introduction of a gas into said manifold through said first breach, through said first manifold channel, through any of said plurality of gas-flow channels, through said second manifold channel, and discharge through said second breach is substantially equivalent to any other of said plurality of gas flow channels.

13. The semi-internally manifolded interconnect of claim 1 wherein said margin extends around approximately 85% of the perimeter of said first facial surface.

14. A semi-internally manifolded interconnect having opposite first and second facial surfaces and structured for placement between successive electrolyte elements in a stack of electrolyte elements comprising:
- a smooth, level margin extending substantially around the perimeter of said first facial surface, said margin comprising a containment seal area for forming a gas-tight seal between the edge of said interconnect and the edge of a first electrolyte element;
- a first manifold channel disposed in said first facial surface inwardly from said margin, said first manifold channel extending from a first end abutting said margin to a second end extending to the edge of said interconnect through a first breach in said margin;
- a second manifold channel disposed in said first facial surface inwardly from said margin and substantially parallel with said first manifold channel, said second manifold channel extending from a first end abutting said margin to a second end extending to the edge of said interconnect through a second breach in said margin;
- a plurality of gas-flow channels disposed in a central area of said first facial surface, said gas-flow channels in fluid communication with and extending between said first and second manifold channels; and
- a plurality of smooth, level ridges comprising the portion of said first surface between successive gas-flow channels, said ridges comprising an area for bonding said central area of said interconnect to an said electrolyte plate.

15. The semi-internally manifolded interconnect of claim 14 wherein the surface of said margin is substantially planar with the surface of said ridges.

16. The semi-internally manifolded interconnect of claim 14 wherein said interconnect is substantially square and said margin is separated into two L-shaped pieces by diagonally positioned said first and second breaches.

17. The semi-internally manifolded interconnect of claim 14 wherein said second facial surface is substantially identical in structure to said first facial surface.

18. The semi-internally manifolded interconnect of claim 17 wherein said first and second manifold channels on said first surface are disposed proximal opposite edges of said first facial surface, and said first and second manifold channels on said second facial surface are disposed proximal opposite edges of said second facial surface.

19. The semi-internally manifolded interconnect of claim 17 wherein said first and second breaches on said first facial surface are disposed proximal diagonal edges of said first facial surface, and said first and second breaches on said second facial surface are disposed proximal diagonal edges of said second facial surface.

20. The semi-internally manifolded interconnect of claim 14 wherein said second facial surface is substantially similar in structure to said first facial surface and is oriented 90° from the orientation of said first surface about an axis perpendicular to both said first and second facial surfaces.

* * * * *